United States Patent [19]

Taniguchi et al.

[11] Patent Number: 5,213,379
[45] Date of Patent: May 25, 1993

[54] FRP PIPE WITH THREADED END JOINT SECTION

[75] Inventors: Kunitoshi Taniguchi, Nishinomiya; Minori Ishii; Masato Ohira, both of Amagasaki, all of Japan

[73] Assignee: Sumitomo Metal Industries, Ltd., Osaka, Japan

[21] Appl. No.: 616,105

[22] Filed: Nov. 20, 1990

[30] Foreign Application Priority Data

Nov. 21, 1989 [JP] Japan .................................. 1-304342
Mar. 27, 1990 [JP] Japan .................................. 2-80241

[51] Int. Cl.⁵ .......................................... F10L 47/00
[52] U.S. Cl. .................................. 285/390; 285/423; 285/919; 138/109; 138/140; 138/DIG. 2
[58] Field of Search ............ 285/288, 289, 423, 919, 285/923, 355, 390, 333, 334; 138/96 T, 137, 140, 144, 153, DIG. 2, 109, 172, 174, 132, 144; 411/908, 424, 411

[56] References Cited

U.S. PATENT DOCUMENTS

| | | | |
|---|---|---|---|
| 494,671 | 4/1893 | Dudley-Cooper | 138/140 |
| 2,082,611 | 6/1937 | Benge | 285/919 X |
| 2,751,237 | 6/1956 | Conley | 138/109 X |
| 2,876,154 | 3/1959 | Usab | 285/919 X |
| 3,124,001 | 3/1964 | Conley | 138/DIG. 2 X |
| 3,200,023 | 8/1965 | Cilker | 138/109 X |
| 3,291,881 | 12/1966 | Michael | |
| 3,381,715 | 5/1968 | Michael | 285/423 X |
| 3,381,716 | 5/1968 | Michael | 285/423 X |
| 3,756,628 | 9/1973 | St. Clair | 285/355 X |
| 3,871,409 | 3/1975 | Gilbu | 138/174 |
| 4,057,610 | 11/1977 | Guettler et al. | 138/174 X |
| 4,104,095 | 8/1978 | Shaw | 138/174 X |
| 4,165,765 | 8/1979 | Gilbu et al. | 138/174 |
| 4,319,076 | 3/1982 | Piur | 285/423 X |
| 4,332,401 | 6/1982 | Stephenson et al. | 285/355 X |
| 4,385,644 | 5/1983 | Kaempen | 285/419 X |

FOREIGN PATENT DOCUMENTS 2320177 10/1973 Fed. Rep. of Germany ...... 285/355
63-242523 10/1988 Japan.
1182671 3/1970 United Kingdom.

*Primary Examiner*—Dave W. Arola
*Assistant Examiner*—Heather Chun
*Attorney, Agent, or Firm*—Burns, Doane, Swecker & Mathis

[57] ABSTRACT

A fiber-reinforced plastic pipe with a male-threaded and/or female-threaded end joint section having improved axial strength and thread contour, exhibiting a high degree of seal tightness, and withstanding a high internal pressure. The female threads comprise a first resin layer, a second fiber-reinforced resin layer having continuous filaments extending at an angle of 0°±15° to the longitudinal axis of the pipe, and a third fiber-reinforced resin layer having continuous filaments extending at an angle of ±85° to 90° to the longitudinal axis. The male threads comprise short fibers flocked in the radial direction on a fiber-reinforced plastic substrate layer and impregnated with a resin.

22 Claims, 4 Drawing Sheets

FRP PIPE WITH THREADED END JOINT SECTION

BACKGROUND OF THE INVENTION

1. Field of the Invention

This invention relates to an FRP pipe having a threaded end section at one end or at both ends. More particularly, it relates to a threaded FRP pipe which has male threads or female threads or both and which is suitable for use as piping, tubing, and casing employed in high-pressure environments such as casing or tubing for the production of oil or gas, pipeline for transporting crude oil or natural gas, and piping in various plants.

The term "FRP" as used herein means fiber-reinforced plastics including not only plastics reinforced with glass fibers but also those reinforced with other inorganic or organic reinforcing fibers.

2. Prior Art

FRP pipes are lighter than steel pipes but have high strength and excellent corrosion resistance. In view of these properties, FRP pipes find a wide variety of applications, and in particular are widely used in corrosive environments. For example, they are used as piping in chemical plants and piping for feeding hot spring water or sea water, as well as casing or tubing for the production of oil or gas and pipeline for transporting crude oil or natural gas.

The most important and difficult facet of piping from a technical viewpoint is joints. This holds true for piping using FRP pipes.

Joints which are presently used to join FRP pipes include adhesive-type insertion joints in which FRP pipes inserted therein are bonded with an adhesive, flange joints, threaded joints, and various mechanical joints. Of these, adhesive-type insertion joints are most widely used to join FRP pipes, but they are designed for use in piping to which a relatively low pressure, e.g., 50 kgf/cm$^2$ or lower, is applied.

For high-pressure piping to which a high pressure, e.g., on the order of 1,000 psi (70 kgf/cm$^2$) or higher is applied, threaded joints, particularly those prescribed in the specifications of the American Petroleum Institute (API), are widely employed.

FRP pipes for use in high-pressure piping such as crude oil pipelines and oil well tubing are usually produced by the filament winding (hereinafter abbreviated as FW) method. The FW method involves impregnating a bundle of continuous filaments (roving) with a resin (generally a thermosetting resin) and winding the impregnated filaments onto a mandrel under tension. After the resin is cured, the mandrel is extracted leaving a formed FRP pipe.

In the production of an FRP pipe by the FW method, a threaded end section serving as a threaded joint with female (internal) threads can be formed by preparing a mandrel having a threaded end section with male (external) threads which mate with the female threads to be formed in the pipe and winding filaments onto the mandrel along its entire length including the threaded end section according to the usual FW method.

In this case, the filaments are not severed, so it is estimated that the desired high strength can be maintained in the female-threaded joint section. However, it is known that the strength properties of the joint section are largely influenced by the winding angle of the filaments. FIG. 1 shows the relationship between tensile strength of an FRP pipe produced by the FW method and winding angle of filaments with respect to the longitudinal axis of the pipe for various types of filaments. As can be seen from FIG. 1, the tensile strength of an FRP pipe rapidly decreases when the winding angle of filaments exceeds ±15°. Therefore, in order to improve the tensile strength of an FRP pipe, it is desirable that the winding angle be in the range of 0±15°.

However, when the FW method conventionally employed in the production of high-pressure FRP pipe is merely applied to the formation of a female-threaded joint section of an FRP pipe, the filaments are wound along the thread grooves of the male threads of the mandrel at a winding angle close to 90° with respect to the longitudinal axis of the pipe. Therefore, there was a problem in the prior-art FRP pipe with a female-threaded joint section that if a high internal pressure is applied to the joint section, the female threads with approximately 90° wound filaments are susceptible to cracking due to the component of stress acting in the axial direction.

In order to cope with the problem, a double winding technique is disclosed in Japanese Patent Application Kokai Nos. 56-44625(1981) and 58-45925(1983) in which filaments are wound onto the corresponding male thread portion of a mandrel initially at an angle between 0° and 30° to the longitudinal axis and subsequently at an angle close to 90° to the axis such that the initially-wound filaments are tightened by the subsequently-wound filaments and forced to descend into the thread grooves of the mandrel.

However, when this double-winding technique is used to form female threads in an FRP pipe having a small thread pitch which is encountered in a threaded pipe joint for oil-well tubing such as a round threaded pipe joint prescribed by API Specification 5B which has 8 or 10 rounds of thread per inch, the initially-wound filaments which are tightened by the subsequently-wound filaments cannot be deflected sufficiently to come into contact with the thread grooves of the mandrel due to the rigidity of the filaments. As a results, voids are frequently formed in the thread grooves, leading to an imperfect shape or contour of the resulting threaded joint section of the pipe.

For this reason, the double winding method disclosed in the above-identified Japanese applications is not applicable to the production of a female-threaded joint of high precision, such as for oil-well tubing which has strict specifications with respect to shape and precision in view of the necessity of maintaining a high degree of seal tightness.

On the other hand, male threads are ordinarily formed in an end section of an FRP pipe by machining the periphery of the pipe in that section after the FRP pipe has been formed by the FW method. Since part of the filaments in the threaded portion are severed by machining, it is difficult to form a male-threaded end section having satisfactorily high strength.

A pipe joint is subject to a tensile force in the axial direction in addition to the internal pressure of the fluid flowing through the pipe. Rupture of a threaded pipe joint caused by an axial tensile force occurs in the form of a shear failure in a thread groove. Therefore, in order to provide a threaded pipe joint having high strength against rupture, it is necessary to strengthen the threaded section against a shearing force in the axial direction. For this purpose it is effective in an FRP pipe joint produced by the FW method to orient the filaments in the radial direction (in the direction of wall thickness), thereby increasing the interlaminar shear strength.

Japanese Patent Application Kokai No. 60-11345(1985) discloses a high-strength male thread prepared from a number of resin-impregnated woven tapes having a width smaller than the diameter of the threaded body. The tapes are gathered and formed into a round rod by means of pultrusion, i.e., drawing them together through a circular die and the resulting rod is then machined to produce male threads on the periphery of the rod. This technique provides male threads having improved axial strength due to the fact that some of the fibers in the weft of the tape are oriented in the radial direction. However, it is directed at male threads on an FRP solid rod formed by pultrusion and it cannot be applied to those on an FRP pipe which is formed by filament winding.

Japanese Patent Application Kokai No. 63-242523(1988) discloses an FRP pipe with a male-threaded end section in which the male threads are formed by wrapping a layer of a resin-impregnated, three-dimensionally woven fabric of reinforcing fibers over the outer periphery of the pipe in an end section thereof and after curing the resin, machining the layer so as to form male threads.

The three-dimensionally woven fabric has vertically-extending fibers across the thickness of the fabric, so the vertically-extending fibers remaining after machining are oriented in the radial direction and contribute to an increase in the interlaminar shear strength (axial strength) of the resulting male threads. However, three-dimensionally woven fabric is expensive and adds to the production costs of an FRP pipe joint incorporating the fabric, which prevents wide use of such joints.

SUMMARY OF THE INVENTION

It is an object of the present invention to provide an FRP pipe with a threaded joint section at one or both ends thereof in which the threaded joint section has satisfactorily high strength.

Another object of the present invention is to provide an FRP pipe with a female-threaded end joint section which withstands high internal pressure without formation of cracks and which can provide a high degree of seal tightness.

A further object of the present invention is to provide an inexpensive FRP pipe with a male-threaded end joint section which has a high shear strength and a process for the production of the same.

In one aspect, the present invention is an FRP pipe with a threaded joint section at one or both ends wherein the end joint section of the pipe has female threads which comprise, from the innermost portion along the height of the threads, a first resin layer, a second fiber-reinforced resin layer having continuous filaments extending at an angle of 0°±15° to the longitudinal axis of the pipe, and a third fiber-reinforced resin layer having continuous filaments extending at an angle of ±85° to 90° to the longitudinal axis. Preferably the first resin layer contains a filler for thickening the resin in the layer and/or a web of short fibers impregnated with the resin for preventing the resulting female threads from hair cracking.

In another aspect, the present invention is an FRP pipe with a threaded joint section at one or both ends wherein the end joint section of the pipe has male threads which comprise short fibers flocked in the radial direction on an FRP substrate layer and impregnated with a resin.

The male threads can be formed on an FRP substrate pipe as an inner layer prepared by the FW method by a process which comprises attaching short fibers uprightly in the radial direction to the outer periphery of at least one end section of the substrate pipe by means of electrostatic flocking, impregnating the fibers with a resin to form a resin-impregnated flocked layer on the substrate pipe, and after the resin is cured, machining the resin-impregnated flocked layer to form male threads.

In a further aspect, the present invention is an FRP pipe having the above-mentioned female threads in a threaded joint section at one end and the above-mentioned male threads in a threaded joint section at the other end.

In an FRP pipe of the present invention, the reinforcing fibers or filaments incorporated in the threaded end section and the remaining pipe body may be inorganic fibers or filaments such as glass fibers or filaments, carbon fibers or filaments, ceramic fibers or filaments, and metal fibers or filaments, as well as organic reinforcing fibers or filaments, e.g., those of an aramide resin such as Kevlar (registered trademark of du Pont). In the following description, reference is mainly made to glass fibers or filaments which are most widely used as reinforcement for FRP.

BRIEF DESCRIPTION OF THE DRAWINGS

The present invention will be described in detail with reference to the accompanying drawings, in which.

DETAILED DESCRIPTION OF PREFERRED EMBODIMENTS

Figure 1:
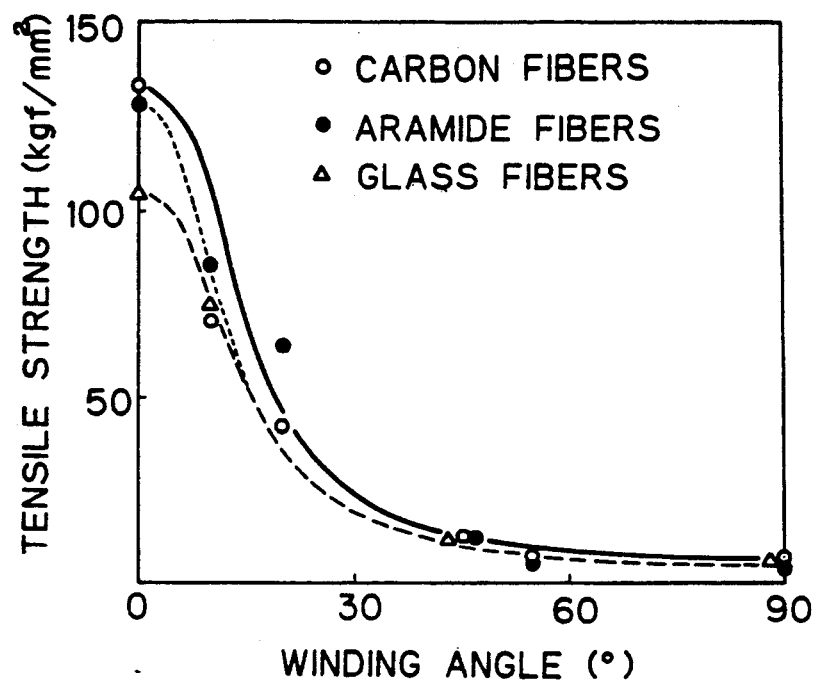
FIG. 1 is a graph showing the relationship between tensile strength of an FRP pipe produced by the FW method and winding angle of filaments for various types of filaments.
Figure 2:
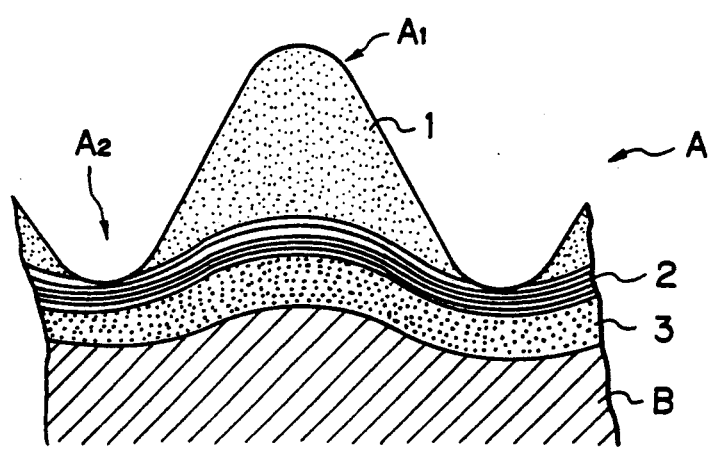
FIG. 2 schematically shows a cross-section of a typical female thread of an FRP pipe according to the present invention.

FIG. 2 shows a cross-section of a typical female thread formed in an end joint section of a female-threaded FRP pipe of the present invention.

An inner female-threaded portion A is formed on the internal surface of an outer body portion B. Each of female threads A1 has a three layer structure of, from the innermost portion along the height of the thread, a first resin layer 1, a second fiber-reinforced resin layer 2 having continuous filaments extending at an angle of 0°±15° to the longitudinal axis of the pipe (hereinafter referred to as an axial winding layer), and a third fiber-reinforced resin layer 3 having continuous filaments extending at an angle of ±85° to 90° to the longitudinal axis (hereinafter referred to as a circumferential winding layer).

The female-threaded portion A may be formed, for example, by applying a thermosetting resin to a threaded end section of a mandrel having male threads mating with the female threads to be formed to form the first resin layer, winding or otherwise wrapping resin-impregnated continuous filaments over the resin layer at a winding angle of 0°±15° to the longitudinal axis of the pipe to form the axial winding layer, and winding additional resin-impregnated continuous filaments over the axial winding layer at a winding angle of ±85° to 90° to the longitudinal axis to form the circumferential winding layer.

The resulting female-threaded portion A has the above-mentioned three-layered structure in each thread A1. The resin is substantially excluded from each thread groove A2 between adjacent threads A1 during filament winding. Therefore, thread grooves A2 consist substantially of the remaining two layers, axial winding layer 2 and circumferential winding layer 3.

In each female thread A1 of the threaded portion A, the resin layer 1 has a desired complete thread contour which mates with the contour of the corresponding thread groove on the mandrel. In contrast, the axial winding layer 2 does not have such a contour. Therefore, if the resin layer is omitted, a void will be formed at the innermost top of the thread, resulting in the formation of an incomplete thread contour.

Thus, the resin layer 1 serves to form a thread A1 of the female-threaded portion A with a complete thread contour, thereby providing the joint section with a high degree of seal tightness. The axial winding layer 2 which is forced to deflect into the resin layer 1 as mentioned below increases strength in the longitudinal direction of the entire female-threaded portion A including the resin layer 1. The circumferential winding layer 3 wound over the axial winding layer 2 forces the filaments in the axial winding layer 2 to deflect into the resin layer 1, thereby improving the formability of the resin layer 1 and the strength of the female-threaded portion A.

The resin layer 1 can be formed from a thermosetting resin. Suitable thermosetting resins include an epoxy resin, a polyester resin, and a vinyl ester resin, all of which are conventionally used in FRP products.

The resin used to form the resin layer 1 has to be retained in the thread grooves of a mandrel. A resin having a low viscosity or high fluidity will readily flow out of the thread grooves of the mandrel and make it difficult to form the desired resin layer 1. A resin generally employed in the FW method has a viscosity of at most 1000 cps. When such a resin is applied to threads of the mandrel, it will readily flow out of the thread grooves without retention therein.

Therefore, it is desirable that the resin in the first layer have an increased retention by thickening the resin. The resin can be thickened by adding a filler to the resin in an amount sufficient to thicken the resin or to afford thixotropic properties thereto. Suitable fillers include a finely divided or fumed silica powder having a particle diameter of not greater than 20 μm, as well as powder of calcium carbonate, magnesium silicate, and the like. It is generally preferred that the amount of the filler added be at most 30% by weight based on the resin, since a higher amount will increase the viscosity of the resin to such a degree that the ease of application of the resin is significantly degraded. Of course, when the resin used has a viscosity sufficient for retention in thread grooves, it can be used as it is without thickening.

The first resin layer 1 may contain a web of short fibers by impregnating the web with the resin in the layer in order to prevent the female threads from cracking, particularly hair cracking. A suitable web is glass mat comprised of short glass fibers. The resin-impregnated web is wound onto the threaded section of a mandrel.

Moreover, the resin layer may contain both the filler and the web of short fibers. Such a resin layer can be formed, for example, by initially applying a filler-containing thickened resin to a male-threaded end section of a mandrel and then winding a resin-impregnated glass mat over the coated resin in that section. In such cases, the retention of the resin is further increased while the resulting female threads are prevented from hair cracking.

Figure 7:
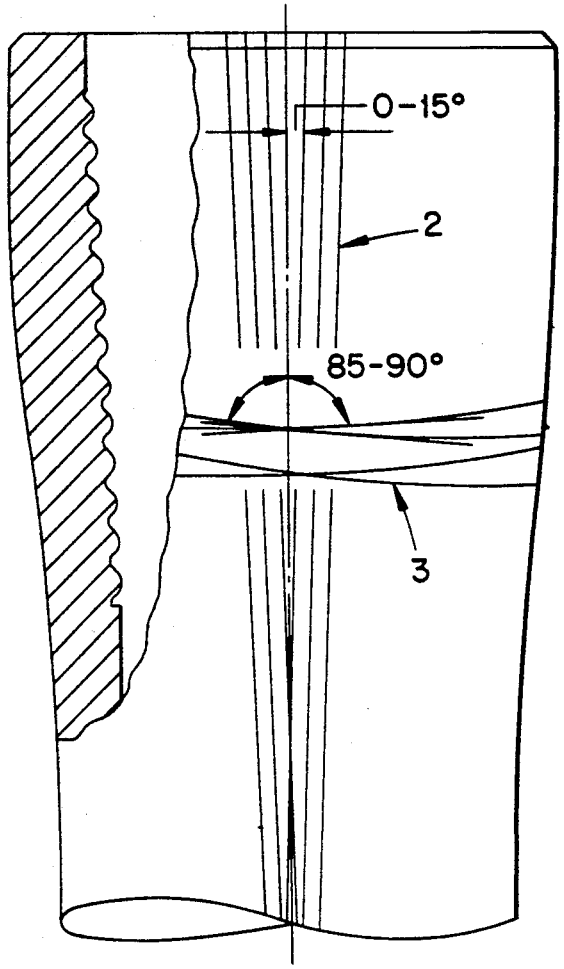
FIG. 7 shows a partially cut-away view of an end of an FRP pipe having female threads in accordance with the invention.

The axial winding layer 2 which overlies the resin layer 1 can be formed, for example, by impregnating a unidirectional flat glass roving (which is a flat bundle of aligned continuous glass filaments) with a resin and wrapping the impregnated flat roving one or more times without tension over the uncured resin applied to the end joint section for forming resin layer 1 in such a manner that the filaments in the roving extend at an angle of 0°±15° to the longitudinal axis of the mandrel, as shown in FIG. 7. Also a unidirectional prepreg may be used to form the axial winding layer 2.

Less preferably, the axial winding layer 2 can be formed by the FW method using an ordinary resin-impregnated glass roving. In this case, the roving may be wound along the entire length of the mandrel under tension. However, due to the tension, it is more difficult to force the roving to deflect into the resin layer during the subsequent circumferential winding.

If the angle of the filaments extending in the axial winding layer 2 exceeds ±15°, the axial strength of the female-threaded portion A will be decreased such that cracking in the female-threaded portion A may occur when a high internal pressure is applied to the joint section.

The circumferential winding layer 3 which overlies the axial winding layer 2 can be formed by winding a glass roving at a winding angle of ±85° to 90° under tension by the FW method, since a main purpose of the circumferential winding is to force the underlying axially-extending filaments to deflect into the thread grooves of the mandrel, as shown in FIG. 7.

If the angle of filaments extending in the circumferential winding layer 3 is less than ±85°, the axially-extending filaments for forming layer 2 will not be deflected significantly into the thread grooves of the mandrel. In this case, intrusion of the axial winding layer 2 into the resin layer 1 does not take place sufficiently, leading to incomplete shaping of the resin layer 1 and insufficient strength of the female-threaded portion.

Each thread A1 of the female-threaded portion A should have the three-layered structure consisting of resin layer 1, axial winding layer 2, and circumferential winding layer 3. The structure and the method of formation of the remaining areas of the threaded portion A are not critical as long as they are made of an FRP. For example, each thread groove A2 of the threaded portion A may consist of two layers of axial winding layer 2 and circumferential winding layer 3. Similarly, the structure and the method of forming the pipe body portions of the FRP pipe including the outer body portion B on the outer periphery of the female-threaded portion A in the end threaded joint section and the pipe wall in the remaining section of the pipe can be selected suitably so that these portions will withstand external and internal pressures applied to the pipe in use.

Figure 3:
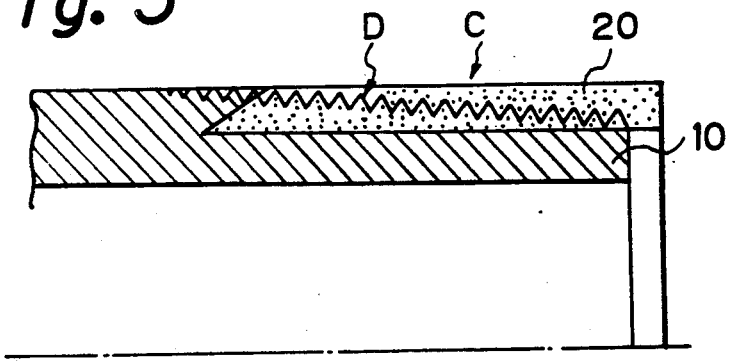
FIGS. 3 and 4 schematically show the upper-half of longitudinal cross-sections of end joint sections of FRP pipes of the present invention before male threads are formed by machining.

FIG. 3 shows the upper half of a longitudinal cross-section of an end joint section of an FRP pipe of the present invention in which male threads are to be formed by machining.

An end section C of the FRP pipe in which male threads are to be formed has two layers comprising a thin filament-wound (FW) inner layer 10 and a resin-impregnated, radially-flocked outer layer 20. The male threads D are formed so as to extend substantially along the length of the flocked layer 20 by machining. The remaining section other than end section C is comprised solely of an FW layer 10.

Figure 4:
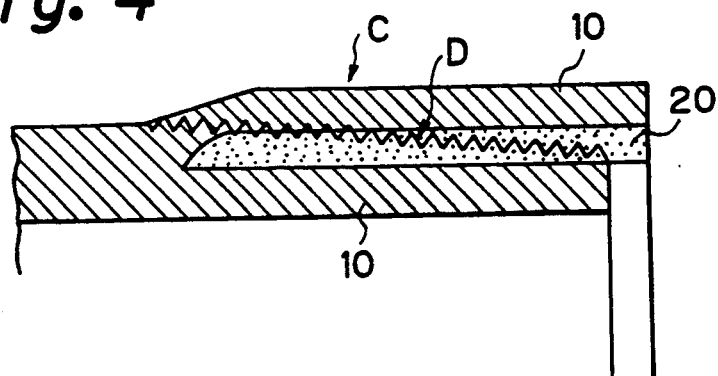

FIG. 4 shows the upper half of a longitudinal cross-section of an end joint section of an FRP pipe in another embodiment of the invention. An end section C of the FRP pipe in which male threads are to be formed has three layers: two FW layers 10, 10 and a resin-impregnated, radially-flocked intermediate layer 20 sandwiched between the two FW layers. Male threads D are formed by machining so as to extend substantially along the length of the intermediate flocked layer 20.

Figure 8:
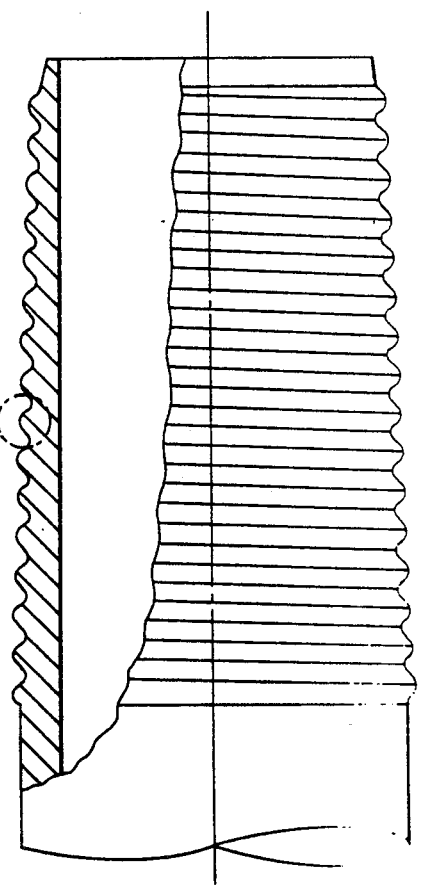
FIG. 8 shows a partially cut-away view of an end of an FRP pipe having male threads in accordance with the invention.
Figure 9:
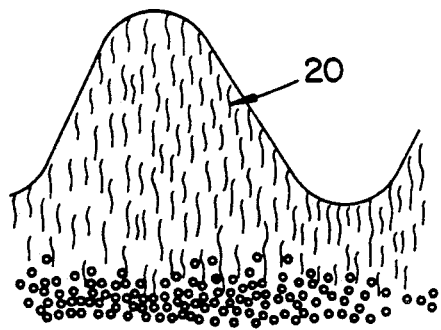
FIG. 9 shows an enlargement taken from detail IX in FIG. 8.

The inner FW layer 10 constitutes an FRP substrate layer on which the resin-impregnated, radially flocked outer layer 20 is formed. The outer flocked layer 20 comprises short fibers or flocks which are substantially aligned uprightly in the direction of wall thickness, i.e., in the radial direction and it constitutes an outer layer in which male threads are to be formed in an end section of the FRP pipe, as shown in FIG. 9. FIG. 9 is an enlargement of the detail IX of a male thread shown in FIG. 8. Thus, the end section is reinforced by the inner FW layer 10, and the radial or upright alignment of flocks in the direction of wall thickness in the outer layer ensures that the male threads formed by machining in the outer layer withstand high interlaminar shear force, thereby providing the joint section with improved strength against tension in the axial direction.

The flocked layer 20 can be readily formed, for example, by electrostatic flocking onto the underlying FW layer 10 which is a substrate pipe prepared by a conventional FW method. In the electrostatic flocking method, short fibers or flocks which have been negatively charged by applying high voltage thereto are uprightly attached to a grounded substrate pipe (inner FW layer 10) by the action of static electricity. The flocked fibers are then impregnated with a thermosetting resin and the resin is cured, resulting in the formation of the resin-impregnated, radially flocked layer 20.

Preferably the short fibers used in the flocked layer 20 have a length in the range of from approximately 1 mm to approximately 3 mm and they are formed from an inorganic material such as glass, carbon, or ceramic, or from an organic material such as a polyamide, a polypropylene, or a polyester.

The resin used for impregnation is preferably a thermosetting resin such as an epoxy, polyester, vinyl ester, or phenolic resin. More preferably the resin is of the rapid-setting type, since a long setting time requires a prolonged operation time, leading to an increase in production costs.

From the viewpoint of rapid setting, the most preferable curing method is curing by irradiation, i.e., photo-setting, using a resin such as an unsaturated polyester resin or a vinyl ester resin. The photo-setting can be completed, for example, by irradiating with visible rays (400–500 nm in wavelength) having an intensity of 20–30 mW/cm$^2$ for 2–7 minutes. Apart from photo-setting, it is also advantageous to shorten the setting time by heat setting or by addition of a curing agent.

The flocked layer 20 has a thickness sufficient to form the male threads 20 within the layer. However, if the thickness of the flocked layer 20 is increased too much, the thickness of the inner FW layer 10 will be decreased correspondingly and it is difficult to obtain a strength level desired for an FRP pipe. For this reason, it is not desirable that the flocked layer 20 have a thickness greater than 50% of the wall thickness of the pipe.

After the resin in the flocked layer 20 located in an end joint section is cured, the FW method is applied to the remaining section which does not serve as a joint so as to form an additional FW layer having nearly the same thickness as the flocked layer along the overall length of the remaining section, as shown in FIG. 3. Thereafter, male threads are machined so as to extend along the length of the flocked layer.

Alternatively, as shown in FIG. 4, the additional FW layer 10 may be extended so as to completely or partially overlay or cover the flocked layer 20. In this case, the portion of the additional FW layer 10 overlying the flocked layer 20 may be thinner than the remaining portion thereof. By extending the additional FW layer in this manner, after male threads D are formed by machining so as to extend along the length of the flocked layer 20 with a slight taper, the formation of a discontinuity between the FW layer 10 and the flocked layer 20 on the surface of the male threads is avoided, thereby further increasing the strength of the male-threaded end section C.

When the flocked layer 20 is overlaid with the additional upper FW layer 10 as shown in FIG. 4, the additional FW layer 10 should be formed after the impregnated resin in the flocked layer 20 has been cured. If the FW method is applied to the flocked layer 20 before curing, the uprightly flocked fibers in the layer are compressed and the radial alignment of the fibers is lost.

The FW layer 10 can be formed in a conventional manner. The method and materials used to form the FW layer 10 are not critical and can be selected so as to form an FRP pipe withstanding internal and external pressures which will be imposed on the pipe in use.

The FRP pipe according to the present invention may have either the above-mentioned female-threaded or male-threaded end joint section at one or both ends. Alternatively, it may have the female-threaded end joint section at one end and the male-threaded end joint section at the other end.

The FRP pipe having a female-threaded and/or male-threaded end joint section according to the invention has improved strength in the joint section. More specifically, the strength of the female threads is improved by the intermediate axial winding layer, thereby providing the female threads with increased resistance to breakage. In addition, the formed threads maintain a complete contour even if the thread pitch is fine, thereby providing the joint section with a high degree of seal tightness and increasing the pressure resistance. The male threads have a significantly improved axial tensile strength and can be formed readily and inexpensively. The FRP pipe can be used in a wide variety of applications and, in particular, it is useful as an oil well pipe or similar pipe which must have a high degree of seal tightness in the joint section.

The following examples are presented as specific illustrations of the claimed invention. It should be understood that the invention is not limited to the specific details set forth in the examples.

EXAMPLE 1

Figure 5:
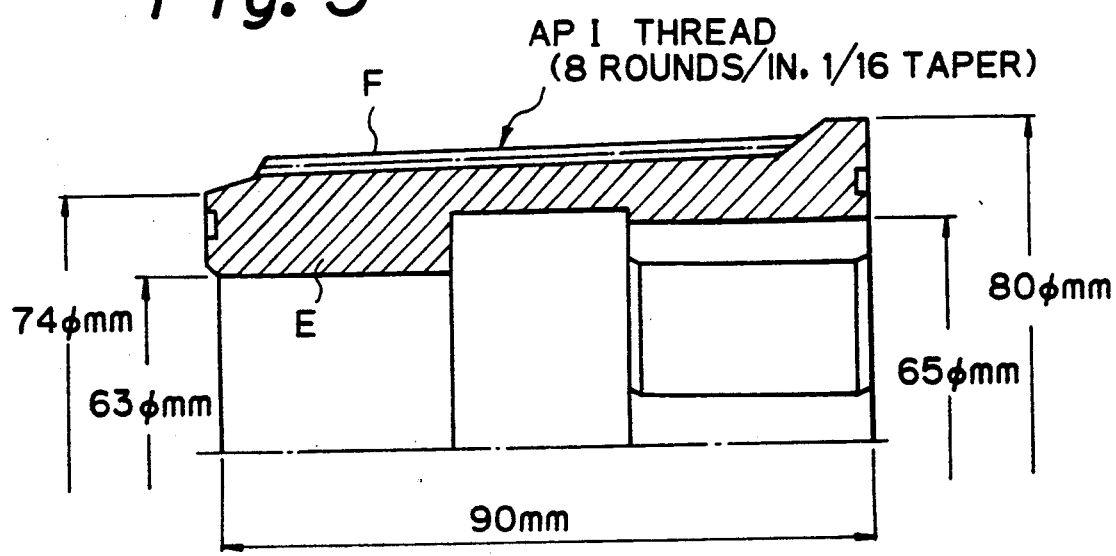
FIG. 5 shows the upper-half of a longitudinal profile of an end joint section of a mandrel used in an example to form a female-threaded joint section of an FRP pipe.

A 2⅜" oil well FRP pipe measuring 62 mm (inner diameter)×8.8 mm (wall thickness) in the body section and having a female-threaded end joint section according to API specification 5B (2⅜", 8 rounds per inch, EUE long) at one end was fabricated using a mandrel E having an end section with the profile shown in FIG. 5 to form the female-threaded section. The mandrel E had a recessed, tapered section at one end and the outer periphery of the end section of the mandrel was fitted with a separate male-threaded cylindrical mold F to form female threads in the resulting FRP pipe. A bisphenol-based epoxy resin (Epikote 828, a tradename of Yuka Shell Epoxy) which contained 80 parts by weight of an acid anhydride-type curing agent (HN-2200, a tradename of Hitachi Chemical) for each 100 parts by weight of the epoxy resin was used as a matrix resin.

The overall outer surface of the male-threaded mold F which was fitted around the end section of the mandrel was coated with the epoxy resin to form a resin layer. Prior to coating, the epoxy resin was thickened by addition of 2% by weight of fumed silica (Cab-O-sil, a tradename of Cabot) followed by thorough mixing. A flat unidirectional glass roving (575TEX, a tradename of Nitto Boseki, 16 Pieces per inch) was then impregnated with the epoxy resin (unthickened) and axially wrapped twice without tension at a winding angle of 0° to the longitudinal axis of the mandrel over the resin-coated, male-threaded mold to form an axial winding layer. Subsequently, a common glass roving (Glasslon, a tradename of Asahi Fiberglass, 20 P/in) was impregnated with the epoxy resin and circumferentially wound over the axial winding layer by the FW method under tension at a winding angle of ±85° until a 1 mm-thick circumferential winding layer was formed. Thereafter, the same impregnated glass roving as used in the circumferential winding was wound according to a conventional FW method along the entire length of the mandrel to a thickness of 8.8 mm to form the pipe body. After the filament-wound mandrel was heated for 4 hours at 150° C. to cure the resin, the threaded mold and the mandrel were extracted to give an FRP pipe with a female-threaded end section.

EXAMPLE 2

An FRP pipe having a female-threaded joint section at one end was fabricated in the same manner as described in Example 1 except that the epoxy resin thickened with fumed silica used to form the first resin layer was replaced by a glass mat (CM 400, a tradename of Asahi Fiberglass) impregnated with the epoxy resin. The impregnated glass mat was wound once around the male-threaded mold to form the resin layer.

EXAMPLE 3

An FRP pipe having a female-threaded joint section at one end was fabricated in the same manner as described in Example 1 except that after the epoxy resin thickened with fumed silica was applied to the outer surface of the male-threaded mold in one end section of the mandrel, the same resin-impregnated glass mat as used in Example 2 was wound around the resin-coated, male-threaded mold to form the first resin layer.

COMPARATIVE EXAMPLE 1

An FRP pipe having a female-threaded joint section at one end was fabricated in the same manner as described in Example 1 except that the axial winding with a flat unidirectional glass roving was eliminated.

COMPARATIVE EXAMPLE 2

An FRP pipe having a female-threaded joint section at one end was fabricated in the same manner as described in Example 1 except that the initial coating of the male-threaded mold with a thickened epoxy resin was eliminated.

The FRP pipes fabricated in the preceding examples and comparative examples were examined with respect to the thread contour of the female threads formed therein. In a separate test, each of these FRP pipes was connected to another FRP pipe having an end joint section with mating male threads and the joint of the resulting connected pipe was subjected to a hydraulic pressure test. The results are shown in Table 1.

As can be seen from Table 1, FRP pipes having female threads which comprise a resin layer and an axial winding layer according to the present invention have a good thread contour stably with no decrease in their resistance to water pressure.

TABLE 1

| Example No. | Thread Contour | Hydraulic Pressure Test | |
|---|---|---|---|
| | | Leakage pressure | Cracking |
| Example 1 | Good | 400 kgf/cm$^2$ | None |
| Example 2 | Good | 400 kgf/cm$^2$ | None |
| Example 3 | Good | 420 kgf/cm$^2$ | None |
| Comparative Example 1 | Good | 260 kgf/cm$^2$ | Cracked |
| Comparative Example 2 | Poor (defective contour) | 50 kgf/cm$^2$ | None |

EXAMPLE 4

Figure 6A:
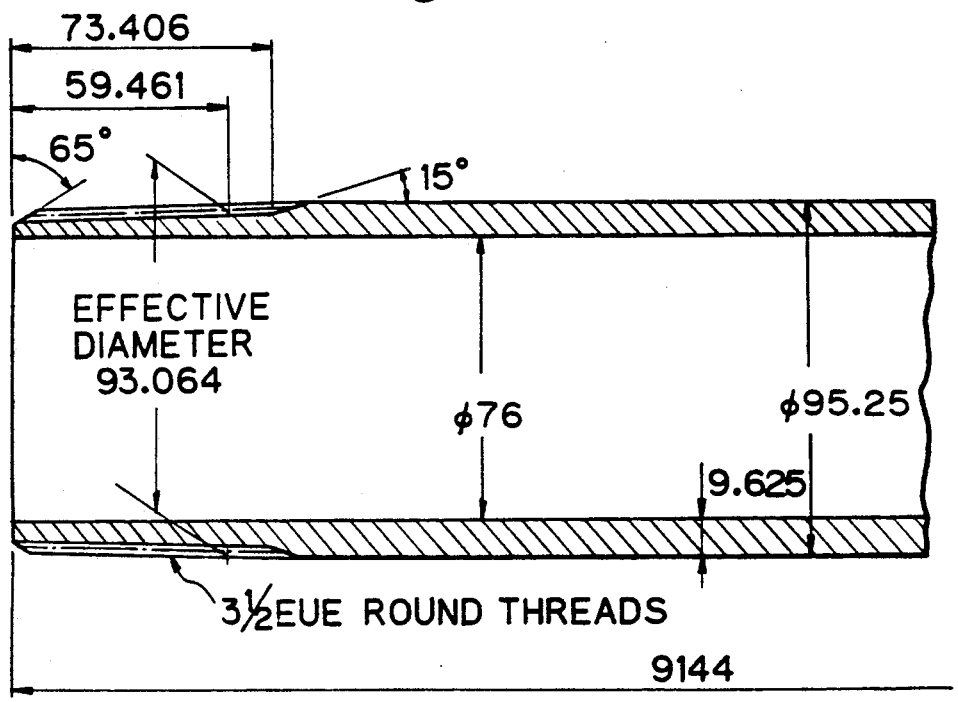
FIGS. 6(a) and 6(b) show a longitudinal profile of a male-threaded end section of an FRP pipe fabricated in an example and the contour of the resulting male threads, respectively.

A 3½" oil well FRP pipe having the profile shown in FIG. 6(a) and measuring 76 mm (inner diameter)×9.625 mm (wall thickness) in the body section and having a male-threaded end joint section according to API specification 5B (3½", 8 rounds per inch, EUE long) at one end was fabricated.

In this and subsequent examples, filament winding to form a pipe was preformed using glass rovings (Glasslon, a tradename of Asahi Fiberglass) and they were impregnated prior to use with the same curing agent-containing epoxy resin as used in Example 1.

First, a 5 mm-thick FRP substrate pipe was formed as an inner FW layer of the desired pipe by the FW method using a mandrel for the formation of a straight pipe having an outer diameter of 76 mm (2.992 inches).

Thereafter, electrostatic flocking was preformed on the outer periphery of a 80 mm-long end section of the FRP substrate pipe in which male threads were to be formed. A static flocking machine (ERO-FLOCK, model BG 1978-7001, manufactured by Ernst Roederstein) was used at a voltage of 80 kV. The flocks used were glass short fibers measuring 13 μm in diameter and 2 mm in length. Subsequently, the flocked fibers were impregnated with a vinyl ester resin (Ripoxy R01, a tradename of Showa High-Polymer) which contained a photo-setting agent (VLC-1, VLC-2, a tradename of Nippon Oil and Fats) and were then irradiated with light from a tungsten lamp having an intensity of 30 mW/cm$^2$ for 2 minutes to cure the resin. The resulting resin-impregnated, radially flocked layer had a thickness of 4 mm.

Figure 6B:
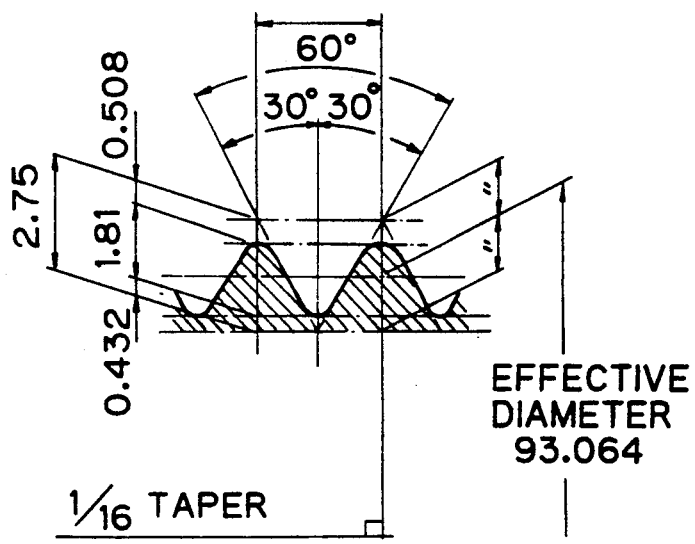

Thereafter, an outer FRP layer was formed to a thickness of 4.6 mm by the FW method along the entire length of the pipe. Finally, male threads having the contour shown in FIG. 6(b) were formed in the end section containing the resin-impregnated flocked layer by machining. The machining exposed the resin-impregnated flocked layer on the outer periphery of the male-threaded end section of the pipe as shown in FIG. 4.

EXAMPLE 5

An FRP pipe with a male-threaded end section was fabricated in the same manner as described in Example 4 except that the flocked fibers used were 2 mm-long polyamide fibers having a diameter of 20 μm.

EXAMPLE 6

An FRP pipe with a male-threaded end section was fabricated in the same manner as described in Example 4 except that the vinyl ester resin used for impregnation of the flocked glass fibers contained 0.5 phr of cobalt naphthenate and 1.0 phr of methyl ethyl ketone peroxide as curing agents and that it was thermally cured by heating with hot air (90° C.×20 minutes).

EXAMPLE 7

An FRP pipe with a male-threaded end section was fabricated in the same manner as described in Example 4 except that a 4.6 mm-thick resin-impregnated, radially flocked layer was the outermost layer prior to machining, i.e., the outer FW layer was omitted, as shown in FIG. 3.

COMPARATIVE EXAMPLE 3

An FRP pipe with a male-threaded end section was fabricated in the same manner as described in Example 4 except that the end joint section of the pipe was formed solely by the FW method in the same manner as the remaining pipe body section, i.e, without forming the intermediate resin-impregnated flocked layer.

COMPARATIVE EXAMPLE 4

An FRP pipe with a male-threaded end section was fabricated in the same manner as described in Example 4 except that the electrostatically flocked glass fibers were not impregnated with a resin.

The male-threaded end joint sections of the FRP pipes fabricated in Examples 4 to 7 and Comparative Examples 3 and 4 were evaluated by an axial tensile test. The test was performed under a torque of 25 kg-m using a thread compound (LOR-105 manufactured by OCR in U.S.A.). The results are shown in Table 2 below. The average shear strength was calculated by dividing the average value for tensile strength at breakage (breaking strength) by the cross-sectional area of the male-threaded portion.

TABLE 2

| Example No. | Breaking Strength (ton) | Average Shear Strength (kgf/mm$^2$) |
|---|---|---|
| Example 4 | 53.2 | 3.34 |
| Example 5 | 48.7 | 3.06 |
| Example 6 | 50.3 | 3.16 |
| Example 7 | 46.8 | 2.94 |
| Comparative Example 3 | 26.2 | 1.65 |
| Comparative Example 4 | 25.3 | 1.59 |

As is apparent from Table 2, the male-threaded joint section of the FRP pipe according to the present invention exhibited significantly improved axial strength.

Although the invention has been described with preferred embodiments, it is to be understood that variations and modifications may be employed without departing from the concept of the invention as defined in the following claims.

What is claimed is:

1. A fiber-reinforced plastic pipe with a threaded joint section at one or both ends wherein the end joint section of the pipe has female threads which comprise, from the radially innermost portion thereof along the heights of the threads, a first resin layer, a second fiber-reinforced resin layer having continuous filaments extending at an angle of 0°±15° to the longitudinal axis of the pipe, and a third fiber-reinforced resin layer having continuous filaments extending at an angle of ±85° to 90° to the longitudinal axis, the first resin layer containing a web of short fibers which is impregnated with the resin in the first layer.

2. The fiber-reinforced plastic pipe as defined in claim 1 wherein the continuous filaments in the fiber-reinforced resin layers are selected from the group consisting of glass filaments, carbon filaments, ceramic filaments, metal filaments, and reinforcing organic filaments.

3. The fiber-reinforced plastic pipe as defined in claim 2 wherein the continuous filaments are glass filaments.

4. The fiber-reinforced plastic pipe as defined in claim 1 wherein the resin in the first resin layer is selected from the group consisting of an epoxy resin, a polyester resin, and a vinyl ester resin.

5. The fiber-reinforced plastic pipe as defined in claim 1 wherein the resin in the first resin layer is thickened to increase its retention.

6. The fiber-reinforced plastic pipe as defined in claim 5 wherein the resin is thickened by addition of a filler.

7. The fiber-reinforced plastic pipe as defined in claim 6 wherein the filler is selected from the group consisting of finely-divided or fumed silica powder, calcium carbonate powder, and magnesium silicate powder.

8. The fiber-reinforced plastic pipe as defined in claim 6 wherein the filler is present in an amount of at most 30% by weight based on the resin.

9. The fiber-reinforced plastic pipe as defined in claim 1 wherein the web is a glass mat comprised of short glass fibers.

10. The fiber-reinforced plastic pipe as defined in claim 1 wherein the first resin layer contains a filler and a web of short fibers.

11. The fiber-reinforced plastic pipe as defined in claim 10 wherein the filler is selected from the group consisting of finely-divided or fumed silica powder, calcium carbonate powder, and magnesium silicate powder and the web is a glass mat comprised of short glass fibers.

12. The fiber-reinforced plastic pipe as defined in claim 1 wherein the filaments in the second fiber-reinforced resin layer are formed by winding a resin-impregnated flat unidirectional roving in the absence of tension.

13. The fiber-reinforced plastic pipe as defined in claim 1 wherein the filaments in the second fiber-reinforced resin layer are formed by winding a unidirectional prepreg.

14. The fiber-reinforced plastic pipe as defined in claim 1 wherein the second fiber-reinforced resin layer comprises an inner layer underlying the female threads and formed by filament winding.

15. A fiber-reinforced plastic pipe with a threaded joint section at one or both ends wherein the end joint section of the pipe has male threads which comprise short fibers flocked in the radial direction on a fiber-reinforced plastic substrate layer and impregnated with a resin, the impregnated resin containing a photo-setting agent.

16. The fiber-reinforced plastic pipe as defined in claim 15 wherein the short fibers are selected from the group consisting of glass fibers, carbon fibers, ceramic fibers, and organic resin fibers.

17. The fiber-reinforced plastic pipe as defined in claim 15 wherein the impregnated resin is a thermosetting resin selected from the group consisting of an epoxy resin, a vinyl ester resin, an unsaturated polyester resin, and a phenolic resin.

18. The fiber-reinforced plastic pipe as defined in claim 15 wherein the short fibers are flocked by electrostatic flocking.

19. The fiber-reinforced plastic pipe as defined in claim 15 wherein the substrate layer is formed by filament winding.

20. The fiber-reinforced plastic pipe as defined in claim 15 wherein the maximum thickness of the short fiber-flocked portion comprises at most 50% of the overall wall thickness.

21. A fiber-reinforced plastic pipe having a threaded joint section at both ends, wherein the joint section of the pipe at one end has female threads which comprise, from the radially innermost portion thereof along the heights of the threads, a first resin layer, a second fiber-reinforced resin layer having continuous filaments extending at an angle of $0° \pm 15°$ to the longitudinal axis of the pipe, and a third fiber-reinforced resin layer having continuous filaments extending at an angle of $\pm 85°$ to 90° to the longitudinal axis, and wherein the joint section of the pipe at the other end has male threads which comprise short fibers flocked in the radial direction on a fiber-reinforced plastic substrate layer and impregnated with a resin.

22. A fiber-reinforced plastic pipe with a threaded joint section of one piece at one or both ends wherein the end joint section of the pipe has male threads which comprise short fibers substantially all of which are flocked in the radial direction on a fiber-reinforced plastic substrate layer and impregnated with a resin.

* * * * *